United States Patent
Yang et al.

(10) Patent No.: US 11,564,134 B2
(45) Date of Patent: Jan. 24, 2023

(54) BEAMFORMING INFORMATION INTERACTION METHOD AND NETWORK DEVICE

(71) Applicant: GUANGDONG OPPO MOBILE TELECOMMUNICATIONS CORP., LTD., Guangdong (CN)

(72) Inventors: Ning Yang, Dongguan (CN); ZhiHua Shi, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/336,455

(22) PCT Filed: Nov. 4, 2016

(86) PCT No.: PCT/CN2016/104778
§ 371 (c)(1),
(2) Date: Mar. 25, 2019

(87) PCT Pub. No.: WO2018/082063
PCT Pub. Date: May 11, 2018

(65) Prior Publication Data
US 2019/0239131 A1    Aug. 1, 2019

(51) Int. Cl.
*H04W 36/00* (2009.01)
*H04W 24/10* (2009.01)
(Continued)

(52) U.S. Cl.
CPC ....... *H04W 36/0058* (2018.08); *H04W 24/10* (2013.01); *H04W 36/00* (2013.01);
(Continued)

(58) Field of Classification Search
None
See application file for complete search history.

(56) References Cited

U.S. PATENT DOCUMENTS 6,438,377 B1 * 8/2002 Savolainen ........... H04W 36/30
370/332
10,645,605 B2 * 5/2020 Jo ........................ H04B 7/0632
(Continued)

FOREIGN PATENT DOCUMENTS

CN    1933652 A    3/2007
CN  101401468 A    4/2009
(Continued)

OTHER PUBLICATIONS

International Search Report in international application No. PCT/CN2016/104778, dated Jun. 28, 2017.
(Continued)

*Primary Examiner* — Faruk Hamza
*Assistant Examiner* — Cassandra L Decker
(74) *Attorney, Agent, or Firm* — Ladas & Parry LLP

(57) ABSTRACT

Disclosed are a beamforming information interaction method and a network device. The method comprises: a first network device receiving first beamforming information sent by a second network device, wherein the first network device is a network device corresponding to a serving cell where a terminal is currently located, the second network device is a network device adjacent to the first network device, and the first beamforming information is information related to beam measurement of the second network device; and the first network device configuring the terminal according to the first beamforming information. In the beamforming information interaction method of the present application, beamforming information is interacted between a network device of a current serving cell and a network device adjacent thereto, and, where a terminal is moved, the currently served network device can configure the terminal in advance according to related information about beam (Continued)

measurement of the adjacent network device, so that the switching efficiency can be improved.

17 Claims, 2 Drawing Sheets

(51) Int. Cl.
  *H04W 36/08* (2009.01)
  *H04W 72/04* (2009.01)
  *H04W 16/28* (2009.01)
(52) U.S. Cl.
  CPC .................. *H04W 36/0072* (2013.01); *H04W 36/0085* (2018.08); *H04W 36/08* (2013.01); *H04W 72/046* (2013.01); *H04W 36/0077* (2013.01)

(56) References Cited

U.S. PATENT DOCUMENTS

| | | | |
|---|---|---|---|
| 2007/0047493 A1* | 3/2007 | Park | H04W 36/0058 370/331 |
| 2009/0298502 A1 | 12/2009 | Hagerman | |
| 2011/0103282 A1* | 5/2011 | Jeon | H04W 52/40 370/331 |
| 2013/0010763 A1* | 1/2013 | Chen | H04L 5/001 370/331 |
| 2013/0322279 A1* | 12/2013 | Chincholi | H04W 76/27 370/252 |
| 2014/0194124 A1 | 7/2014 | Xiao et al. | |
| 2015/0181492 A1* | 6/2015 | Schmidt | H04W 36/30 455/436 |
| 2015/0327143 A1* | 11/2015 | Won | H04W 24/10 370/332 |
| 2016/0044551 A1 | 2/2016 | Frenger et al. | |
| 2016/0150435 A1* | 5/2016 | Baek | H04W 24/08 370/252 |
| 2017/0033854 A1 | 2/2017 | Yoo | |
| 2017/0054534 A1* | 2/2017 | Sang | H04W 72/046 |
| 2017/0215117 A1* | 7/2017 | Kwon | H04B 7/04 |
| 2017/0318491 A1* | 11/2017 | Chen | H04L 5/0073 |
| 2017/0353870 A1 | 12/2017 | Rybakowski et al. | |
| 2018/0083680 A1* | 3/2018 | Guo | H04L 5/0048 |
| 2018/0139673 A1* | 5/2018 | Peisa | H04W 72/082 |
| 2018/0359790 A1* | 12/2018 | Ingale | H04W 8/22 |
| 2018/0367382 A1* | 12/2018 | Zhang | H04W 72/044 |
| 2019/0059105 A1* | 2/2019 | Harada | H04W 16/10 |
| 2019/0109687 A1* | 4/2019 | Takeda | H04B 7/088 |
| 2019/0223043 A1* | 7/2019 | Geng | H04B 7/0695 |
| 2020/0028599 A1* | 1/2020 | Zhang | H04B 7/08 |

FOREIGN PATENT DOCUMENTS

| | | | |
|---|---|---|---|
| CN | 103002526 | A | 3/2013 |
| CN | 103096372 | A | 5/2013 |
| CN | 105790886 | A | 7/2016 |
| CN | 106033989 | A | 10/2016 |
| CN | 107733486 | A | 2/2018 |
| GB | 2532067 | A | 5/2016 |
| JP | 2014531852 | A | 11/2014 |
| JP | 2015185955 | A | 10/2015 |
| JP | 2017510210 | A | 4/2017 |
| RU | 2599613 | C1 | 10/2016 |
| WO | 2015133823 | A1 | 9/2015 |
| WO | 2015150020 | A1 | 10/2015 |
| WO | 2015156575 | A1 | 10/2015 |
| WO | 2016003336 | A1 | 1/2016 |
| WO | 2016072052 | A1 | 5/2016 |
| WO | 2016086144 | A1 | 6/2016 |
| WO | 2016096006 | A1 | 6/2016 |
| WO | 2016163786 | A1 | 10/2016 |
| WO | 2018053767 | A1 | 3/2018 |

OTHER PUBLICATIONS

Written Opinion of the International Search Authority in international application No. PCT/CN2016/104778, dated Jun. 28, 2017.
English translation of the Written Opinion of the International Search Authority in the international application No. PCT/CN2016/104778, dated Jun. 28, 2017.
Supplementary European Search Report in the European application No. 16920868.3, dated Jun. 28, 2019.
Samsung: "More details for the "NR cell"", 3GPP Draft; R2-164726 NR Cell Details, 3rd Generation Partnership Project (3GPP), Mobile Competence Centre : 650, Route Des Lucioles ; F-06921 Sophia-Antipolis Cedex; France, vol. RAN WG2, no. Gothenburg, Sweden; Aug. 22, 2016-Aug. 26, 2016 Aug. 21, 2016 (Aug. 21, 2016), XP051126484, Retrieved from the Internet: URL:http://www.3gpp.org/ftp/Meetings_3GPP_SYNC/RAN2/Docs/ [retrieved on Aug. 21, 2016] paragraph [0002]—paragraph [0003]; table 1.
NEC: "Intra-Cell and Inter-Cell Mobility in NR", 3GPP Draft; R2-166769, 3rd Generation Partnership Project (3GPP), Mobile Competence Centre ; 650, Route Des Lucioles ; F-06921 Sophia-Antipolis Cedex ; France, vol. RAN WG2, no. Kaohsiung, Taiwan; Oct. 10, 2016-Oct. 14, 2016 Oct. 9, 2016 (Oct. 9, 2016), XP051151227, Retrieved from the Internet: URL:http://www.3gpp.org/ftp/Meetings_3GPP_SYNC/RAN2/Docs/ [retrieved on Oct. 9, 2016] paragraph [0002].
First Office Action in corresponding Russian application No. 2019113674, dated Feb. 6, 2020.
First Office Action in corresponding Chinese application No. 201680089291.3, dated Mar. 16, 2020.
Written Opinion of the Singaporean application No. 11201902562X, dated May 5, 2020.
First Office Action of the Chilean application No. 201901068, dated Jun. 11, 2020.
Second Office Action of the Chinese application No. 201680089291.3, dated Jun. 10, 2020.
R2-167285 Summary of RAN2#95bis offline discussions on NR Cell definition and relation to beams in Connected mode, Ericsson, Kaohslung, Taiwan, Oct. 10-14, 2016, pp. 1-2.
R2-167157 Evaluation of beam-based RRM Measurement, Samsung Electronics Co., Ltd, Kaoslung, Taiwan, Oct. 10-14, 2016, 6 pages.
Ericsson, "Summary of RAN2#95bis offline discussions on NR Cell definition and relation to beams in Connected mode", 3GPP TSG-RAN WG2 #95bis Tdoc R2-167285, Kaohsiung, Taiwan, Oct. 10-14, 2016.
Samsung, Electronics Co., Ltd, "Evaluate at beam-based RRM Measurement", 3GPP TSG-RAN WG2 Meeting #95bis R2-167157 Kaohsiung, Taiwan, Oct. 10-14, 2016 (Revision of R2-166101).
Third Office Action of the Chinese application No. 201680089291.3, dated Aug. 26, 2020.
First Office Action of the Canadian application No. 3037580, dated Jan. 24, 2020.
First Office Action of the Brazilian application No. BR1120190074066, dated Sep. 1, 2020.
First Office Action of the Japanese application No. 2019-515648 dated Sep. 15, 2020.
Office Action of the Indian application No. 201917013577, dated Sep. 16, 2020.
First Office Action of the Israeli application No. 265464, dated Nov. 9, 2020.
First Office Action of the European application No. 16920868.3, dated Jan. 13, 2021.
Second Office Action of the Canadian application No. 3037580, dated Nov. 26, 2020.
Second Office Action of the Chilean application No. 201901068, dated Feb. 8, 2021.
First Office Action of the Taiwanese application No. 106137776, dated Feb. 26, 2021.
Second Written Opinion of the Singaporean application No. 11201902562X, dated Mar. 16, 2021.
First Office Action of the Indonesian application No. P00201904400, dated Apr. 26, 2021.
First Office Action of the Australian application No. 2016428463, dated Aug. 6, 2021.

(56) References Cited

OTHER PUBLICATIONS

Third Office Action of the Canadian application No. 3037580, dated Sep. 22, 2021.
First Office Action of the Japanese application No. 2021-022068, dated Apr. 19, 2022.
Third Office Action of the Chilean application No. 201901068, dated Mar. 2, 2022.
Third Office Action of the Australian application No. 2016428463, dated Apr. 7, 2022.
Notice of rejection of Decision of the Singaporean application No. 11201902562X, dated May 19, 2022.
Second Office Action of the Chinese application No. 202110184784.8, dated Jun. 16, 2022.
Second Office Action of the Australian application No. 2016428463, dated Dec. 9, 2021.
First Office Action of the Chinese application No. 202110184784.8, dated Jan. 6, 2022.
Second Office Action of the Indonesian application No. P00201904400, dated Jan. 12, 2022.
First Office Action of the Malaysian application No. PI2019001700, dated Oct. 31, 2022.

* cited by examiner

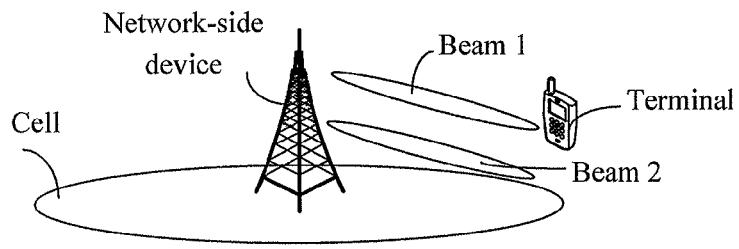

FIG. 1

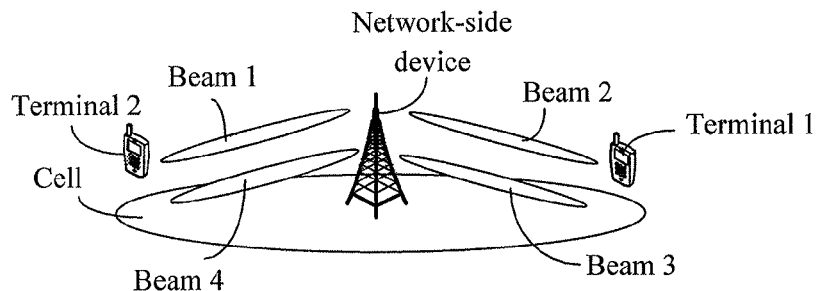

FIG. 2

```
A first network device receives first beamforming
information sent by a second network device, the
   first network device being a network device
   corresponding to a present serving cell for a       ⟋310
   terminal, the second network device being a
  neighbouring network device of the first network
    device and the first beamforming information
being information related to beam measurement of
           the second network device
```

```
                                                       ⟋320
  The first network device configures the terminal
   according to the first beamforming information
```

FIG. 3

BEAMFORMING INFORMATION INTERACTION METHOD AND NETWORK DEVICE

RELATED APPLICATION

This application is an application under 35 U.S.C. 371 of International Application No. PCT/CN2016/104778 filed on Nov. 4, 2016, the entire contents of which are incorporated herein by reference.

TECHNICAL FIELD

The disclosure relates to the field of communications, and particularly to a method for beamforming information interaction and a network device.

BACKGROUND

Along with the continuous development of wireless communication technology, requirements of a wireless communication system on coverage and wireless bandwidths for transmission have gradually increased and the wireless communication system may ensure coverage capabilities of networks through a beamforming technology.

The beamforming technology refers to an antenna array-based signal preprocessing technology that generates a directional beam by adjusting a weighting coefficient of each array element in an antenna array to obtain a significant array gain. In the beamforming technology, after a terminal accesses a cell, a network device to which the cell belongs allocates a beam suitable for data transmission of the terminal for the terminal. When the terminal moves, handover of the cell and/or the network device may be performed. Under this condition, a beam corresponding to a neighbouring network device of the present serving cell is required to be re-measured, which may cause a relatively long handover latency.

SUMMARY

The disclosure provides a beamforming information interaction method and a network device, which may configure a mobile terminal in advance and may improve handover efficiency.

According to a first aspect, the disclosure provides a method for beamforming information interaction, which may include the following operations. A first network device receives first beamforming information sent by a second network device. The first network device is a network device corresponding to a present serving cell for a terminal, the second network device is a neighbouring network device of the first network device and the first beamforming information is information related to beam measurement of the second network device. The first network device configures the terminal according to the first beamforming information.

According to the method for beamforming information interaction of the first aspect, the network device of the present serving cell performs beamforming information interaction with the adjacent network device, and when the terminal moves, the present serving network device may configure the terminal in advance according to the information related to beam measurement of the adjacent network device. Therefore, handover efficiency may be improved.

In combination with the first aspect, in a possible implementation mode of the first aspect, the first beamforming information may include first measurement configuration information. The operation that the first network device configures the terminal according to the first beamforming information may include that: the first network device configures the terminal for beam measurement according to the first measurement configuration information.

In combination with the first aspect or any abovementioned possible implementation mode, in a possible implementation mode of the first aspect, the method may further include the following operation. The first network device sends parameter request information to the second network device, and the parameter request information is configured to request the second network device for the first measurement configuration information.

In combination with the first aspect or any abovementioned possible implementation mode, in a possible implementation mode of the first aspect, the first measurement configuration information may include at least one of a beam index, an identifier of a beam group to which the beam belongs, a cell identifier corresponding to the beam, an identifier of an Access Point (AP) corresponding to the beam, an identifier of a base station corresponding to the beam, a measurement frequency, a measurement cycle, a measurement duration, a measurement mode, a beamforming resource allocation parameter or information of a reference signal corresponding to the beam.

In combination with the first aspect or any abovementioned possible implementation mode, in a possible implementation mode of the first aspect, the first measurement configuration information may be carried in network device configuration signaling or handover configuration signaling.

In combination with the first aspect or any abovementioned possible implementation mode, in a possible implementation mode of the first aspect, the network device configuration signaling may include establishing signaling of a network device interface or updating signaling of a network device configuration.

In combination with the first aspect or any abovementioned possible implementation mode, in a possible implementation mode of the first aspect, the first beamforming information may include a first measurement result, The operation that the first network device configures the terminal according to the first beamforming information may include that: the first network device performs the cell handover for the terminal according to the first measurement result.

In combination with the first aspect or any abovementioned possible implementation mode in a possible implementation mode of the first aspect, the method may further include the following operations. The first network device sends second measurement configuration information to the second network device and the terminal, and the second measurement configuration information is configured to instruct the terminal to send an uplink test signal on the beam according to the second measurement configuration information. The first network device performs beam measurement to obtain a second measurement result based on the uplink test signal. The operation that the first network device performs the cell handover for the terminal according to the first measurement result may include that: the first network device performs the cell handover for the terminal according to the first measurement result and the second measurement result.

In combination with the first aspect or any abovementioned possible implementation mode, in a possible implementation mode of the first aspect, the method may further include the following operations. The first network device sends measurement configuration coordination information to the second network device, and the measurement configuration coordination information is configured to coordinate with the second network device about measurement configuration information used for measurement of the uplink test signal on the beam. The first network device receives feedback information of the measurement configuration coordination information from the second network device.

In combination with the first aspect or any abovementioned possible implementation mode, in a possible implementation mode of the first aspect, the first measurement result may be carried in the handover configuration signaling.

In combination with the first aspect or any abovementioned possible implementation mode, in a possible implementation mode of the first aspect, the handover configuration signaling may be handover request signaling or handover confirmation signaling.

In combination with the first aspect or any abovementioned possible implementation mode, in a possible implementation mode of the first aspect, the method may further include the following operation. The first network device sends second beamforming information to a third network device, and the second beamforming information is information related to beam measurement of the first network device.

According to a second aspect, the disclosure provides a network device, which may be a first network device and include a receiving module and a processing module. The receiving module is configured to receive first beamforming information sent by a second network device. The first network device is a network device corresponding to a present serving cell for a terminal, the second network device is a neighbouring network device of the first network device and the first beamforming information is information related to beam measurement of the second network device. The processing module is configured to configure the terminal according to the first beamforming information received by the receiving module.

In combination with the second aspect, in a possible implementation mode of the second aspect, the first beamforming information may include first measurement configuration information. The processing module may specifically be configured to configure the terminal for beam measurement according to the first measurement configuration information.

In combination with the second aspect or any abovementioned possible implementation mode, in a possible implementation mode of the second aspect, the network device may further include a sending module, configured to send parameter request information to the second network device. The parameter request information may be configured to request the second network device for the first measurement configuration information.

In combination with the second aspect or any abovementioned possible implementation mode, in a possible implementation mode of the second aspect, the first measurement configuration information may include at least one of a beam index, an identifier of a beam group to which the beam belongs, a cell identifier corresponding to the beam, an identifier of an AP corresponding to the beam, an identifier of a base station corresponding to the beam, a measurement frequency, a measurement cycle, a measurement duration, a measurement mode, a beamforming resource allocation parameter or information of a reference signal corresponding to the beam.

In combination with the second aspect or any abovementioned possible implementation mode, in a possible implementation mode of the second aspect, the first measurement configuration information may be carried in network device configuration signaling or handover configuration signaling.

In combination with the second aspect or any abovementioned possible implementation mode, in a possible implementation mode of the second aspect, the network device configuration signaling may include establishing signaling of a network device interface or updating signaling of a network device configuration.

In combination with the second aspect or any abovementioned possible implementation mode, in a possible implementation mode of the second aspect, the first beamforming information may include a first measurement result. The processing module may specifically be configured to perform the cell handover for the terminal according to the first measurement result.

In combination with the second aspect or any abovementioned possible implementation mode in a possible implementation mode of the second aspect, the network device may further include the sending module, configured to send second measurement configuration information to the second network device and the terminal. The second measurement configuration information may be configured to instruct the terminal to send an uplink test signal on the beam according to the second measurement configuration information. The processing module may further be configured to perform beam measurement to obtain a second measurement result based on the uplink test signal. The operation that the processing module performs the cell handover for the terminal according to the first measurement result may include that: the processing module performs the cell handover for the terminal according to the first measurement result and the second measurement result.

In combination with the second aspect or any abovementioned possible implementation mode, in a possible implementation mode of the second aspect, the network device may further include the sending module, configured to send measurement configuration coordination information to the second network device. The measurement configuration coordination information may be configured to coordinate with the second network device about measurement configuration information used for measurement of the uplink test signal on the beam. The receiving module may further be configured to receive feedback information of the measurement configuration coordination information from the second network device.

In combination with the second aspect or any abovementioned possible implementation mode, in a possible implementation mode of the second aspect, the first measurement result may be carried in the handover configuration signaling.

In combination with the second aspect or any abovementioned possible implementation mode, in a possible implementation mode of the second aspect, the handover configuration signaling may be handover request signaling or handover confirmation signaling.

In combination with the second aspect or any abovementioned possible implementation mode, in a possible implementation mode of the second aspect, the network device may further include the sending module, configured to send second beamforming information to a third network device. The second beamforming information may be information related to beam measurement of the first network device.

According to a third aspect, the disclosure provides a network device, which includes a processor, transceiver and memory, configured to realize corresponding functions of the network device in the abovementioned aspects. The function of each device may be realized through hardware and may also be realized by executing corresponding software through the hardware.

According to a fourth aspect, the disclosure provides a computer-readable storage medium, which is configured to store a program code for a beam measurement method. The program code is configured to execute a method instruction in the first aspect.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

FIG. 1 is a schematic diagram of an application scenario of a beam measurement method according to an embodiment of the disclosure.

FIG. 2 is a schematic diagram of another application scenario of a beam measurement method according to an embodiment of the disclosure.

FIG. 3 is a schematic flowchart of a method for beamforming information interaction according to an embodiment of the disclosure.

DETAILED DESCRIPTION

Figure 4:
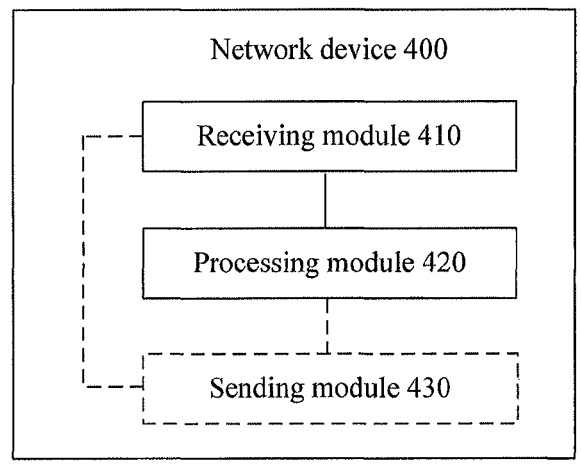
FIG. 4 is a schematic block diagram of a network device according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS) system, a Long Term Evolution (LTE) system, a Wireless Local Area Network (WLAN) system, a Public Land Mobile Network (PLMN) system and a 5th-Generation (5G) New Radio (NR) system.

It is also to be understood that a terminal may also be called User Equipment (UE), may also be called a mobile terminal, a mobile device and the like and may communicate with one or more core networks through, for example, a Radio Access Network (RAN). The UE may be a mobile terminal, for example, a mobile phone (or called a "cellular" phone) and a computer with a mobile terminal function. For example, the terminal may also be a portable, pocket, handheld, computer-embedded or vehicle-mounted mobile device and performs language and/or data exchange with the RAN.

It is also to be understood that a network device may be a device configured to communicate with the terminal. The network device may be an AP in the WLAN system, a Base Transceiver Station (BTS) in the GSM or the CDMA system, may also be a NodeB (NB) in the WCDMA system, and may further be an Evolutional Node B (NB or eNodeB) in the LTE system, or a relay station or AP, or a vehicle-mounted device, a wearable device, a network device in a future 5G network system, a network device in a future evolved PLMN system or the like.

In addition, a cell involved in the embodiments of the disclosure may refer to the concept of a cell in an existing cellular network and may also be the concept based on an AP, a transmission point or a base station. There are no limits made thereto in the embodiments of the disclosure.

For convenient comprehension, an application scenario of a beam measurement method according to the embodiments of the disclosure will be introduced at first.

FIG. 1 is a schematic diagram of an application scenario of a beam measurement method according to an embodiment of the disclosure. From the application scenario illustrated in FIG. 1, it can be seen that in a cell, there may exist a beam (not illustrated in FIG. 1) configured for signaling transmission of a control channel and multiple beams (referring to beam 1 and beam 2 in FIG. 1) configured for data transmission of a data channel. That is, in the cell, the whole cell may be covered by a "wide beam" configured for signaling transmission of the control channel and the whole cell may be covered by multiple "narrow beams" configured for signaling transmission of the data channel.

FIG. 2 is a schematic diagram of another application scenario of a beam measurement method according to an embodiment of the disclosure. From the application scenario illustrated in FIG. 2, it can be seen that in the cell, there may exist multiple "narrow beams" (referring to beam 1 and beam 2 in FIG. 2) configured for control signaling transmission of a control channel and there may also exist multiple "narrow beams" (referring to beam 3 and beam 4 in FIG. 2) configured for data transmission of a data channel. A terminal 1 may perform control signaling interaction with a network device through the beam 2, the terminal 1 may perform data transmission with the network device through the beam 3, a terminal 2 may perform control signaling interaction with the network device through the beam 1 and the terminal 2 may perform data transmission with the network device through the beam 4. That is, the terminals may perform signaling interaction with the network device through the "narrow beams" configured for control signaling transmission of the control channel. The terminals may also perform data transmission with the network device through the "narrow beams" configured for data transmission of the data channel. The beams configured for control signaling transmission of the control channel between the terminals and the network device and the beams configured for data transmission of the data channel between the terminal and the network device may be the same and may also be different. It is to be understood that FIG. 2 only illustrates the condition that the beams configured for control signaling transmission of the control channel between the terminals and the network device are different from the beams configured for data transmission of the data channel between the terminals and the network device as an example.

It is to be noted that signal quality and/or signal strength for signal transmission between the terminal and the network device may be improved by use of a relatively high beamforming gain of a "narrow beam" relative to a "wide beam".

It is to be understood that the terminal in each embodiment of the disclosure may be a terminal in a connected state, that is, there is a Non-Access Stratum (NAS) or Access Stratum (AS) signaling connection established between the terminal and the network-side device. It may also be a terminal in an idle state, that is, there is no NAS or AS signaling connection established between the terminal and the network-side device. There are no limits made thereto in the embodiments of the disclosure.

FIG. 3 is a schematic flowchart of a method 300 for beamforming information interaction according to an embodiment of the disclosure. The method 300 is executed by a first network device. The method 300 may include the following operations.

In S310, the first network device receives first beamforming information sent by a second network device. The first network device is a network device corresponding to a present serving cell for a terminal, the second network device is a neighbouring network device of the first network device and the first beamforming information is information related to beam measurement of the second network device.

In S320, the first network device configures the terminal according to the first beamforming information.

According to the method for beamforming information interaction of the embodiment of the disclosure, the network device of the present serving cell performs beamforming information interaction with the adjacent network device, and when the terminal moves, the present serving network device may configure the terminal in advance according to the information related to beam measurement of the adjacent network device. Therefore, handover efficiency may be improved.

In the embodiment of the disclosure, the first beamforming information may include first measurement configuration information and may also include a first measurement result. The operation of configuring the terminal may include configuring the terminal for beam reselection (namely configuring a reselection criterion), configuring the terminal for beam measurement, triggering the terminal for cell handover or the like. The embodiment of the disclosure is not limited to the above processing and other processing related to beamforming may also be included.

In at least one embodiment, when the first beamforming information includes the first measurement configuration information, the operation in S320 that the first network device configures the terminal according to the first beamforming information may include the following operation. The first network device configures the terminal for beam measurement according to the first measurement configuration information.

Specifically, when the terminal moves and probably moves from the cell (the serving cell) of the first network device to a cell (adjacent to the serving cell) of the second network device, different network devices may use different measurement configuration information (which may also be called beamforming parameters), and thus the measurement configuration information may be exchanged between the first network device and the second network device in advance. Particularly, the second network device may send the first measurement configuration information of its own beam to the first network device, i.e., the network device corresponding to the serving cell where the terminal is presently located. The first network device configures the terminal to measure the beam corresponding to the second network device according to the first measurement configuration information.

In the embodiment of the disclosure, for the transmission of the first measurement configuration information to the first network device, the second network device may periodically send the first measurement configuration information and may also sent the first measurement configuration information responsive to a request of the second network device. Correspondingly, the method 300 may further include the following operation. The first network device sends parameter request information to the second network device, and the parameter request information is configured to request the second network device for the first measurement configuration information.

Specifically, the first network device may detect a present position, signal strength, signal quality and the like of the terminal to determine whether the terminal will be handed over to the adjacent cell due to the movement of the terminal. Responsive to determining by the first network device that the terminal may be handed over to the adjacent cell, the first network device sends the parameter request information to the second network device to request the second network device for the first measurement configuration information, so as to learn about the information related to the beam of the adjacent second network device in advance, thereby preparing for subsequent corresponding reselection or handover configuration of the terminal.

Specifically, the first measurement configuration information may include at least one of a beam index, an identifier of a beam group to which the beam belongs, a cell identifier corresponding to the beam, an identifier of an AP corresponding to the beam, an identifier of a base station corresponding to the beam, a measurement frequency, a measurement cycle, a measurement duration, a measurement mode, a beamforming resource allocation parameter or information of a reference signal corresponding to the beam.

The information of the reference signal corresponding to the beam may include a non-UE specific reference signal corresponding to the beam and/or a UE specific reference signal corresponding to the beam.

The information in the first measurement configuration information may be related to the beam, for example, the beam index, the identifier of the beam group, the beamforming resource allocation parameter (for example, time-frequency resources or antenna port for sending the beam), the non-UE specific reference signal corresponding to the beam and the UE specific reference signal corresponding to the beam. The information in the measurement configuration information may also be unrelated to the beam, for example, the identifier of the cell, the identifier of the AP, the identifier of the base station, the measurement frequency, the measurement cycle, the measurement duration and the measurement mode.

It is to be understood that the beam, the beam group, the cell, the AP and the base station are based on different layers. For example, the first measurement configuration information may be a parameter applicable to one or more beams, and then the identifier in the first measurement configuration information may be an identifier/identifiers of the one or more beams. For another example, the first measurement configuration information may be a parameter applicable to all beams in one or more cells, and then the identifier in the first measurement configuration information may be an identifier/identifiers of the one or more cells. Similarly, the first measurement configuration information may be for a beam group (for example, beams in a cell may be divided into one or more beam groups), AP or base station layer, and correspondingly, the identifier in the first measurement configuration information may be an identifier/identifiers of the one or more beam groups, an identifier/identifiers of one or more APs, an identifier/identifiers of one or more base stations, and the like. There are no limits made thereto in the embodiment of the disclosure.

All of the information, listed above, in the first measurement configuration information is optional and part of information may be specified through a protocol or exchanged through other signaling. For example, when the first measurement configuration information may be applied to multiple beams, since a measurement duration is related to a sweeping duration of a beam, a measurement duration of each beam in a system may be the same, the measurement duration may be specified in the protocol or set to be a default value and the first measurement configuration information may include no measurement duration. For another example, the measurement mode may include the measurement duration and/or the measurement cycle, and then the first measurement configuration information may include no measurement duration and/or no measurement cycle. For another example, the measurement frequency forms a certain mathematical relationship with the measurement cycle, and then the first measurement configuration information may only include one of the measurement frequency and the measurement cycle. The information in the first measurement configuration information will not be elaborated one by one herein.

It is to be understood that the information in the first measurement configuration information may be the information per se and may also be indexes, serial numbers or the like available for indicating the information contents. There are no limits made thereto in the embodiment of the disclosure.

In at least one embodiment, the first measurement configuration information may be carried in network device configuration signaling or handover configuration signaling. The network device configuration signaling may be establishing signaling of a network device interface or updating signaling of a network device configuration. The establishing signaling of the network device interface may be, for example, establishing signaling of an X2 interface in an LTE system. The handover configuration signaling may be, for example, handover request signaling or handover confirmation signaling in the LTE system. It is to be understood that the first measurement configuration information may also be carried in other signaling of an existing system or carried in newly defined interaction signaling in a future system. There are no limits made thereto in the embodiment of the disclosure.

In at least one embodiment, the first beamforming information includes the first measurement result. The operation in S320 that the first network device configures the terminal according to the first beamforming information may include that: the first network device performs the cell handover for the terminal according to the first measurement result.

Specifically, when the terminal moves and probably moves from the cell (the serving cell) of the first network device to the cell (adjacent to the serving cell) of the second network device, the first network device and the second network device may perform the interaction of a beam measurement result in advance. Particularly, the second network device may send a measurement result of its own beam to the first network device, i.e., the network device corresponding to the serving cell where the terminal is presently located. The first network device determines whether to hand over the terminal to the beam, beam group or cell of the second network device according to the measurement result.

A process of initiating beam measurement and obtaining the first measurement result may be as follows. The first network device sends second measurement configuration information for instructing the terminal to send an uplink test signal on the beam to the second network device. Alternatively, the first network device coordinates with the second network device about the second measurement configuration information used for the uplink test signal on the beam. Then, the first network device configures the terminal served by the first network device to send the uplink test signal on the beam according to the second measurement configuration information. The first network device and the second network device simultaneously perform beam measurement, the second network device reports the corresponding first measurement result to the first network device, and the first network device makes a handover decision based on the first measurement result and/or another measurement result (for example, a downlink beam measurement result).

Correspondingly, in a solution, the method 300 may further include the following operations. The first network device sends second measurement configuration information to the second network device and the terminal, and the second measurement configuration information is configured to instruct the terminal to send an uplink test signal on the beam according to the second measurement configuration information. The first network device performs beam measurement to obtain a second measurement result based on the uplink test signal. The operation that the first network device performs the cell handover for the terminal according to the first measurement result includes that: the first network device performs the cell handover for the terminal according to the first measurement result and the second measurement result. In the solution, the first network device directly determines the second measurement configuration information and notifies the second network device to use the second measurement configuration information for beam measurement.

In another solution, the first network device and the second network device may coordinate about a measurement configuration for the uplink test signal on the beam. A specific negotiation process may be as follows. The first network device sends measurement configuration coordination information to the second network device, and the measurement configuration coordination information is configured to coordinate with the second network device about measurement configuration information used for measurement of the uplink test signal on the beam. The first network device receives feedback information of the measurement configuration coordination information from the second network device. The first network device and the second network device perform measurement of the uplink test signal on the beam according to the measurement configuration obtained by negotiation to obtain the first measurement result and the second measurement result respectively.

It is to be understood that the first measurement result of the embodiment of the disclosure may be carried in the handover configuration signaling. The handover configuration signaling may be the handover request signaling or the handover confirmation signaling.

In at least one embodiment, the method 300 may further include the following operation. The first network device sends second beamforming information to a third network device, and the second beamforming information is information related to beam measurement of the first network device.

Specifically, for the other terminal, the first network device may be not a network device of a present serving cell of the other terminal (for example, the network device of the present serving cell of the other terminal is the third network device) but a network device of a neighbouring cell of the present serving cell of the other terminal. The other terminal is likely to be moving from the third network device to the first network device. In such case, the first network device, as a neighbouring network device of the third network device, sends the information related to its beam measurement, i.e., the second beamforming information, to the third network device and then the third network device configures the other terminal according to the second beamforming information.

The method for beamforming information interaction of the embodiments of the disclosure is described above in combination with FIG. 1 to FIG. 3 in detail. A network device of the embodiments of the disclosure will be described below in combination with FIG. 4 and FIG. 5 in detail.

FIG. 4 is a schematic block diagram of a network device according to an embodiment of the disclosure. The network device 400 is a first network device in the disclosure. The network device 400 illustrated in FIG. 4 includes a receiving module 410 and a processing module 420.

The receiving module 410 is configured to receive first beamforming information sent by a second network device. The first network device is a network device corresponding to a present serving cell for a terminal, the second network device is a neighbouring network device of the first network device and the first beamforming information is information related to beam measurement of the second network device.

The processing module 420 is configured to configure the terminal according to the first beamforming information received by the receiving module 410.

The network device of the embodiment of the disclosure, i.e., the network device of the present serving cell, performs beamforming information interaction with the adjacent network device, and when the terminal moves, the present serving network device may configure the terminal in advance according to the information related to beam measurement of the adjacent network device. Therefore, handover efficiency may be improved.

In at least one embodiment, the first beamforming information may include first measurement configuration information, and the processing module 420 may specifically be configured to configure the terminal for beam measurement according to the first measurement configuration information.

In at least one embodiment, the network device 400 may further include a sending module 430, configured to send parameter request information to the second network device. The parameter request information is configured to request the second network device for the first measurement configuration information.

In at least one embodiment, the first measurement configuration information may include at least one of a beam index, an identifier of a beam group to which the beam belongs, a cell identifier corresponding to the beam, an identifier of an AP corresponding to the beam, an identifier of a base station corresponding to the beam, a measurement frequency, a measurement cycle, a measurement duration, a measurement mode, a beamforming resource allocation parameter or information of a reference signal corresponding to the beam.

In at least one embodiment, the first measurement configuration information may be carried in network device configuration signaling or handover configuration signaling.

In at least one embodiment, the network device configuration signaling may be establishing signaling of a network device interface or updating signaling of a network device configuration.

In at least one embodiment, the first beamforming information may include a first measurement result. The processing module 420 may specifically be configured to perform the cell handover for the terminal according to the first measurement result.

In at least one embodiment, the network device may further include the sending module 430, configured to send second measurement configuration information to the second network device and the terminal. The second measurement configuration information is configured to instruct the terminal to send an uplink test signal on the beam according to the second measurement configuration information. The processing module 420 may further be configured to perform beam measurement to obtain a second measurement result based on the uplink test signal. The operation that the processing module 420 performs the cell handover for the terminal according to the first measurement result may include the following action. The processing module may perform cell handover for the terminal according to the first measurement result and the second measurement result.

In at least one embodiment, the network device further includes the sending module 430, configured to send measurement configuration coordination information to the second network device. The measurement configuration coordination information is configured to coordinate with the second network device about measurement configuration information used for measurement of the uplink test signal on the beam. The receiving module 410 may further be configured to receive feedback information of the measurement configuration coordination information from the second network device.

In at least one embodiment, the first measurement result may be carried in the handover configuration signaling.

In at least one embodiment, the handover configuration signaling may be handover request signaling or handover confirmation signaling.

In at least one embodiment, as an embodiment, the network device may further include the sending module 430, configured to send second beamforming information to a third network device. The second beamforming information is information related to beam measurement of the first network device.

Figure 5:
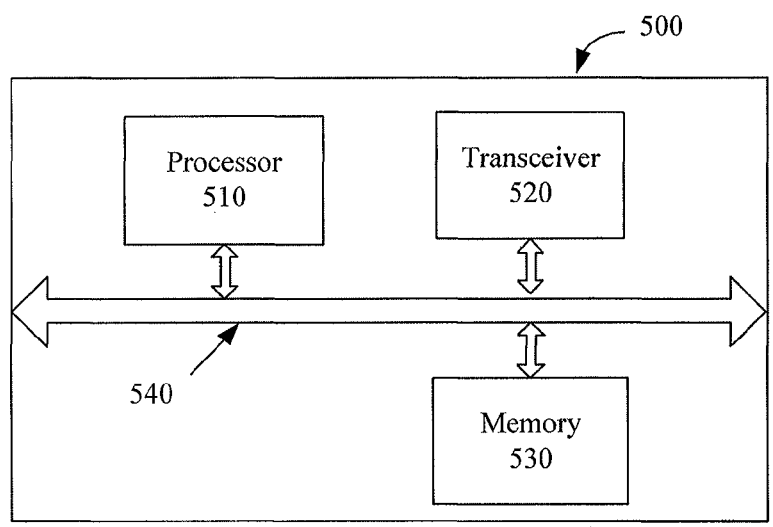
FIG. 5 is a schematic block diagram of a network device according to another embodiment of the disclosure.

It is to be noted that in the embodiment of the disclosure, the receiving module 410 and the sending module 430 may be implemented by a transceiver and the processing module 420 may be implemented by a processor. As illustrated in FIG. 5, a network device 500 may include a processor 510, a transceiver 520 and a memory 530. The memory 530 may be configured to store a code executed by the processor 510 and the like.

Components in the network device 500 are coupled together through a bus system 540. The bus system 540 includes a data bus, and further includes a power bus, a control bus and a state signal bus.

The network device 500 illustrated in FIG. 5 or the network device 400 illustrated in FIG. 4 may implement each process implemented in the embodiments of FIG. 1 to FIG. 3. No more elaborations will be made herein to avoid repetitions.

It is to be noted that the method embodiment of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or electrically erasable programmable memory and a register. The storage medium is located in a memory. The processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" at any place of the whole specification does not always refer to the same embodiment. In addition, these specific features, structures or characteristics may be combined in one or more embodiments in any proper manner.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

It is to be understood that in the embodiments of the disclosure, "B corresponding to A" represents that B is associated with A and B may be determined according to A. It is also to be understood that determining B according to A does not mean that B is determined only according to A and B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for beamforming information interaction, comprising:
receiving, by a first network device, first beamforming information sent by a second network device, the first network device being a network device corresponding to a present serving cell for a terminal, the second network device being a neighbouring network device of the first network device, wherein the first beamforming information is information related to beam measurement of the second network device, and the first beamforming information comprises first measurement configuration information applicable to all beams in multiple cells and the first measurement configuration information comprises a measurement frequency, a measurement cycle, a measurement duration, a beamforming resource allocation parameter, and cell identifiers of the multiple cells; and configuring, by the first network device, the terminal according to the first beamforming information, wherein the first beamforming information further comprises a first measurement result; and the method further comprises:

performing, by the first network device, beam measurement to obtain a second measurement result based on an uplink signal, and performing, by the first network device, a cell handover for the terminal according to the first measurement result and the second measurement result, wherein the method further comprises:

sending, by the first network device, measurement configuration coordination information to the second network device, the measurement configuration coordination information being configured to negotiate with the second network device about measurement configuration information used for measurement of the uplink signal on a beam; and receiving, by the first network device, feedback information of the measurement configuration coordination information from the second network device, the feedback information being used to measure the uplink signal to determine the first and second measurement results.

2. The method of claim 1, wherein configuring, by the first network device, the terminal according to the first beamforming information comprises:

configuring, by the first network device, the terminal for beam measurement according to the first measurement configuration information.

3. The method of claim 2, further comprising:

sending, by the first network device, parameter request information to the second network device, the parameter request information being configured to request the second network device for the first measurement configuration information.

4. The method of claim 3, wherein responsive to determining by the first network device that the terminal is capable of being handed over to the adjacent cell, sending, by the first network device, the parameter request information to the second network device.

5. The method of claim 2, wherein the first measurement configuration information is carried in network device configuration signaling or handover configuration signaling.

6. The method of claim 5, wherein the network device configuration signaling comprises establishing signaling of a network device interface or updating signaling of a network device configuration.

7. The method of claim 1, further comprising:

sending, by the first network device, second measurement configuration information to the terminal, the second measurement configuration information being configured to instruct the terminal to send the uplink signal on the beam according to the second measurement configuration information.

8. The method of claim 1, wherein the first measurement result is carried in handover configuration signaling, and the handover configuration signaling comprises handover request signaling or handover confirmation Signaling.

9. The method of claim 1, further comprising:

sending, by the first network device, second beamforming information to a third network device, the second beamforming information being information related to beam measurement of the first network device.

10. The method of claim 1, wherein the first measurement result is obtained by the second network device performing beam measurement based on the uplink signal.

11. A network device, the network device being a first network device and comprising:

a transceiver, configured to receive first beamforming information sent by a second network device, the first network device being a network device corresponding to a present serving cell for a terminal, the second network device being a neighbouring network device of the first network device, wherein the first beamforming information is information related to beam measurement of the second network device, and the first beamforming information comprises first measurement configuration information applicable to all beams in multiple cells and the first measurement configuration information comprises a measurement frequency, a measurement cycle, a measurement duration, a beamforming resource allocation parameter, and cell identifiers of the multiple cells; and a processor, configured to configure the terminal according to the first beamforming information received by the transceiver, wherein the first beamforming information further comprises a first measurement result; and the processor is further configured to perform beam measurement to obtain a second measurement result based on an uplink signal, and perform a cell handover for the terminal according to the first measurement result and the second measurement result, the transceiver is further configured to:

send measurement configuration coordination information to the second network device, the measurement configuration coordination information being configured to negotiate with the second network device about measurement configuration information used for measurement of the uplink signal on a beam; and receive feedback information of the measurement configuration coordination information from the second network device, the feedback information being used to measure the uplink signal to determine the first and second measurement results.

12. The network device of claim 11, wherein the processor is specifically configured to:

configure the terminal for beam measurement according to the first measurement configuration information.

13. The network device of claim 12, wherein the transceiver is further configured to send parameter request information to the second network device, the parameter request information being configured to request the second network device for the first measurement configuration information.

14. The network device of claim 11, wherein the transceiver is further configured to send second measurement configuration information to the terminal, the second measurement configuration information being configured to instruct the terminal to send the uplink signal on the beam according to the second measurement configuration information.

15. The network device of claim 11, wherein the transceiver is further configured to send second beamforming information to a third network device, the second beamforming information being information related to beam measurement of the first network device.

16. A method for beamforming information interaction, comprising:
  receiving, by a first network device, first beamforming information sent by a second network device, the first network device being a network device corresponding to a present serving cell for a terminal, the second network device being a neighbouring network device of the first network device, wherein the first beamforming information is information related to beam measurement of the second network device, and the first beamforming information comprises a first measurement result; and
  configuring, by the first network device, the terminal according to the first beamforming information, comprising:
    sending, by the first network device, second measurement configuration information to the terminal, the second measurement configuration information being configured to instruct the terminal to send an uplink signal on a beam according to the second measurement configuration information;
    performing, by the first network device, beam measurement to obtain a second measurement result based on the uplink signal; and
    performing, by the first network device, a cell handover for the terminal according to the first measurement result and the second measurement result,
  wherein the method further comprises:
    sending, by the first network device, measurement configuration coordination information to the second network device, the measurement configuration coordination information being configured to negotiate with the second network device about measurement configuration information used for measurement of the uplink signal on the beam; and
    receiving, by the first network device, feedback information of the measurement configuration coordination information from the second network device, the feedback information being used to measure the uplink signal to determine the first and second measurement results.

17. The method of claim 16, wherein the first measurement result is obtained by the second network device performing beam measurement based on the uplink signal.

* * * * *